US010482927B2

(12) United States Patent
Huang et al.

(10) Patent No.: US 10,482,927 B2
(45) Date of Patent: Nov. 19, 2019

(54) WATERPROOF MODULE AND SEAL MEMBER THEREOF

(71) Applicant: GETAC TECHNOLOGY CORPORATION, Hsinchu County (TW)

(72) Inventors: Tzu-Chiu Huang, Taipei (TW); Juei-Chi Chang, Taipei (TW)

(73) Assignee: ETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/031,169

(22) Filed: Jul. 10, 2018

(65) Prior Publication Data

US 2019/0244640 A1    Aug. 8, 2019

(30) Foreign Application Priority Data

Feb. 7, 2018   (TW) .............................. 107104223 A (51) Int. Cl.
  *G11B 33/14*    (2006.01)
  *G11B 33/02*    (2006.01)
  *G11B 17/053*   (2006.01)

(52) U.S. Cl.
  CPC .......... *G11B 33/1453* (2013.01); *G11B 33/02* (2013.01); *G11B 33/14* (2013.01); *G11B 17/053* (2013.01)

(58) Field of Classification Search
  None
  See application file for complete search history.

(56) References Cited

U.S. PATENT DOCUMENTS

| 6,137,760 A * | 10/2000 | Okamoto ........... G11B 17/0405 720/647 |
| 6,595,608 B1 * | 7/2003 | Minelli ................ G11B 33/027 16/336 |

(Continued)

FOREIGN PATENT DOCUMENTS

| CN | 201549541 U | 8/2010 |
| CN | 102427184 A | 4/2012 |

(Continued)

OTHER PUBLICATIONS

"Disk device and computer system," JP 3814945 B2, Machine translation, published Aug. 30, 2006. (Year: 2006).*

(Continued)

*Primary Examiner* — William J Klimowicz (57) ABSTRACT

A waterproof module includes a housing, an optical disc drive and a seal member. The housing has an outer surface, an opening and an inner surface defining a receiving space. The opening penetrates the outer surface and communicates with the receiving space. The optical disc drive includes a disc tray and a body disposed in the receiving space. The disc tray includes a tray body and a cover plate disposed at one end of the tray body. The tray body is slidable relative to the body between a retracted position and an ejected position. The seal member includes a connecting portion and a resilient portion. The connecting portion is stacked on the cover plate. The resilient portion surrounds the connecting portion. When the disc tray moves from the ejected position to the retracted position, the resilient portion presses against the outer surface and seals the opening.

19 Claims, 10 Drawing Sheets

(56) References Cited

U.S. PATENT DOCUMENTS

| | | | |
|---|---|---|---|
| 7,843,689 B2 | 11/2010 | Moore et al. | |
| 8,205,220 B2* | 6/2012 | Kim | G11B 33/1446 720/601 |
| 8,619,417 B1 | 12/2013 | Helton | |
| 2005/0138652 A1* | 6/2005 | Liao | G11B 17/0405 720/647 |
| 2005/0289572 A1* | 12/2005 | Chen | G11B 33/1446 720/648 |
| 2006/0005211 A1* | 1/2006 | Yamazaki | G06F 1/1616 720/600 |
| 2010/0313485 A1* | 12/2010 | Kuo | A45C 5/03 49/484.1 |
| 2016/0027465 A1* | 1/2016 | Lee | G11B 17/04 720/613 |
| 2016/0050783 A1* | 2/2016 | Li | G06F 1/1613 361/679.01 |

FOREIGN PATENT DOCUMENTS

| | | | | |
|---|---|---|---|---|
| CN | 104701666 A | | 6/2015 | |
| CN | 204598613 U | | 9/2015 | |
| CN | 206412093 U | * | 8/2017 | |
| CN | 107436627 A | | 12/2017 | |
| JP | 63052396 A | * | 3/1988 | |
| JP | 05315765 A | * | 11/1993 | |
| JP | 09180428 A | * | 7/1997 | |
| JP | 10021679 A | * | 1/1998 | G11B 17/056 |
| JP | 10162565 A | * | 6/1998 | G11B 17/056 |
| JP | 2000011510 A | * | 1/2000 | G11B 17/056 |
| JP | 2001266441 A | * | 9/2001 | G11B 17/056 |
| JP | 2003030915 A | * | 1/2003 | |
| JP | 2006018903 A | | 1/2006 | |
| JP | 3814945 B2 | * | 8/2006 | |
| JP | 2008198290 A | * | 8/2008 | G11B 17/056 |
| JP | 2009289638 A | * | 12/2009 | G11B 17/056 |
| TW | 413381 U | | 11/2000 | |
| TW | M374640 U | | 2/2010 | |
| WO | WO 2004/100167 A1 | | 11/2004 | |

OTHER PUBLICATIONS

Konuta, et al. "Electronic Apparatus," JP 2008198290 A, Machine translation, published Aug. 28, 2008. (Year: 2008).*

Dallas Thomas, "The iPhone 8 & iPhone X Are IP67 Water-Resistant—Here's What That Really Means," (published Sep. 12, 2017) at https://ios.gadgethacks.com/news/iphone-8-iphone-x-are-ip67-water-resistant-heres-what-really-means-0179990/ (Year: 2017).*

* cited by examiner

WATERPROOF MODULE AND SEAL MEMBER THEREOF

CROSS-REFERENCE TO RELATED APPLICATIONS

This application claims priority from Taiwan Patent Application No. 107104223, filed on Feb. 7, 2018, the entire disclosure of which is hereby incorporated by reference.

BACKGROUND OF THE INVENTION

Field of the Invention

The present invention relates to waterproof modules and seal members thereof and, more particularly, to a waterproof module with a seal member for covering an opening of a housing of the waterproof module and an inserting element which the seal member is disposed on.

Description of the Prior Art

Owing to everlasting advancement of information technology, it is feasible for personal computers, industrial computers, military computers, and digital electronic products to enhance performance thereof and expand functions thereof by connecting with external electronic devices with various functions. Examples for the aforesaid function-expanding electronic devices include optical disc drives, CD-RW (CD-ReWritable), hard disk drives, floppy disk drives and rechargeable batteries. Industrial computers and military computers operate in harsher environments than personal computers; hence, industrial computers and military computers have stricter usage requirements, for example, being waterproof, dustproof, corrosion resistant and vibration resistant.

In general, to prevent intrusion of dust, splashes and foreign bodies into a housing of a conventional electronic product through an opening of the housing, a concealer, such as a movable door structure, is disposed at the opening to not only open and shut the opening but also protect the opening without reducing ease of use. Regarding a conventional electronic product with waterproof level IP65 or higher, its optical disc drive is usually designed to be disposed inside its waterproof door, and the electronic product is structurally complicated because of its strict waterproof requirement to therefore require an intricate manufacturing process and incur high manufacturing costs. By contrast, a conventional electronic product with a low waterproof level, its optical disc drive is not waterproof, and it is merely required to, for example, be able to boot after undergoing a rain test which complies with IPX2 standard. However, in the aforesaid situation, water still intrudes into the optical disc drive. Since the aforesaid electronic product has low waterproof requirement, that is, a mere requirement to prevent intrusion of water, the aforesaid component with a high waterproof level, for example, a waterproof door, adds to the manufacturing costs of the electronic products, whereas a cover disposed on a conventional optical disc drive fails to prevent intrusion of water. Therefore, developers in this field are interested in find a way to prevent intrusion of water into electronic products and keep the manufacturing costs of electronic products low.

SUMMARY OF THE INVENTION

The present invention provides a waterproof module and a seal member thereof with a view to overcoming drawbacks of the prior art as follows: high-level waterproof components of electronic products adds to the manufacturing costs of the electronic products, and a cover disposed on a conventional inserting element fails to prevent intrusion of water.

The waterproof module disclosed in an embodiment of the present invention comprises a housing, an optical disc drive and a seal member. The housing has an inner surface, an outer surface and an opening. The inner surface defines a receiving space. The opening penetrates the outer surface and is in communication with the receiving space. The optical disc drive comprises a body and a disc tray. The body is disposed in the receiving space. The disc tray comprises a tray body and a cover plate. The cover plate is disposed at one end of the tray body. The tray body is slidable relative to the body such that the disc tray has a retracted position and an ejected position. The seal member comprises a connecting portion and a resilient portion. The connecting portion is stacked on the cover plate. The resilient portion surrounds the connecting portion. The resilient portion presses against the outer surface and seals the opening when the disc tray moves from the ejected position to the retracted position.

The waterproof module disclosed in another embodiment of the present invention comprises a housing, an inserting element and a seal member. The housing has an opening. The inserting element enters and exits the housing through the opening. The seal member comprises a connecting portion and a resilient portion. The seal member is fixed to the inserting element by the connecting portion. The resilient portion surrounds the connecting portion. The outer rim of the opening or the outer surface of the housing blocks the resilient portion when the inserting element is at a retracted position.

Regarding a waterproof module and a seal member thereof disclosed in the aforesaid embodiment, the seal member with resilience or elasticity is disposed on an inserting element of an optical disc drive. As soon as the disc tray moves from the ejected position to the retracted position, the resilient portion of the seal member interferes with the housing and thereby presses tightly against the outer surface of the housing or the outer rim of the opening, so as to cover the opening of the housing. Hence, the waterproof module is effective in sealing the opening and thus attains a waterproof level required to prevent intrusion of water at the very least.

The above description of the present invention and the description of embodiments thereof below not only illustrate and explain the principles of the present invention but also provide further interpretation of the claims of the present invention.

DETAILED DESCRIPTION OF THE EMBODIMENTS

The fine features and advantages of embodiments of the present invention are described below so as to enable persons skilled in the art to gain insight into the technical disclosure in the embodiments of the present invention and implement the present invention accordingly and readily understand the objectives and advantages of the present invention by making reference to the disclosure contained in the specification, the claims, and the drawings of the present invention. The embodiments presented below further illustrate the viewpoints of the present invention but are not intended to use any viewpoint to limit the scope of the present invention.

Figure 1:
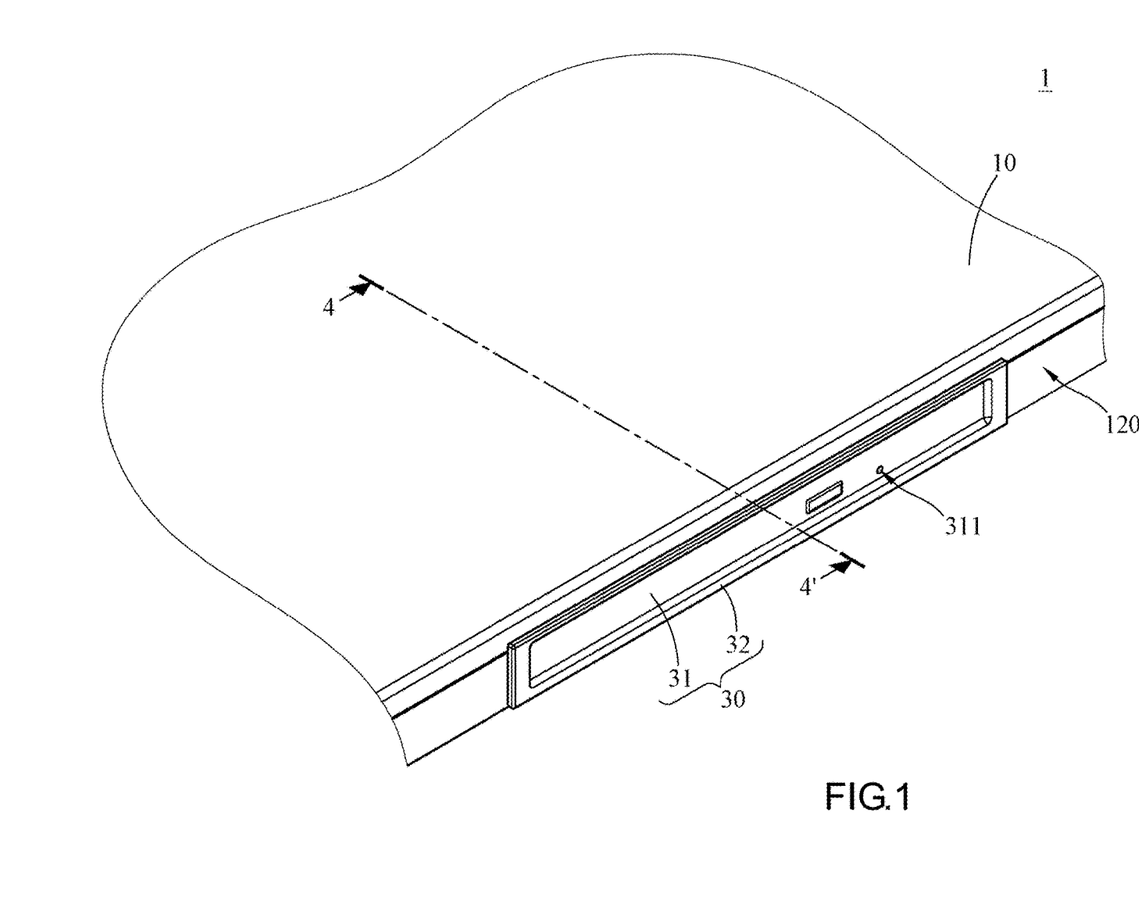
FIG. 1 is a perspective view of a waterproof module according to an embodiment of the present invention, showing that an optical disc drive of the waterproof module is at a retracted position.
Figure 2:
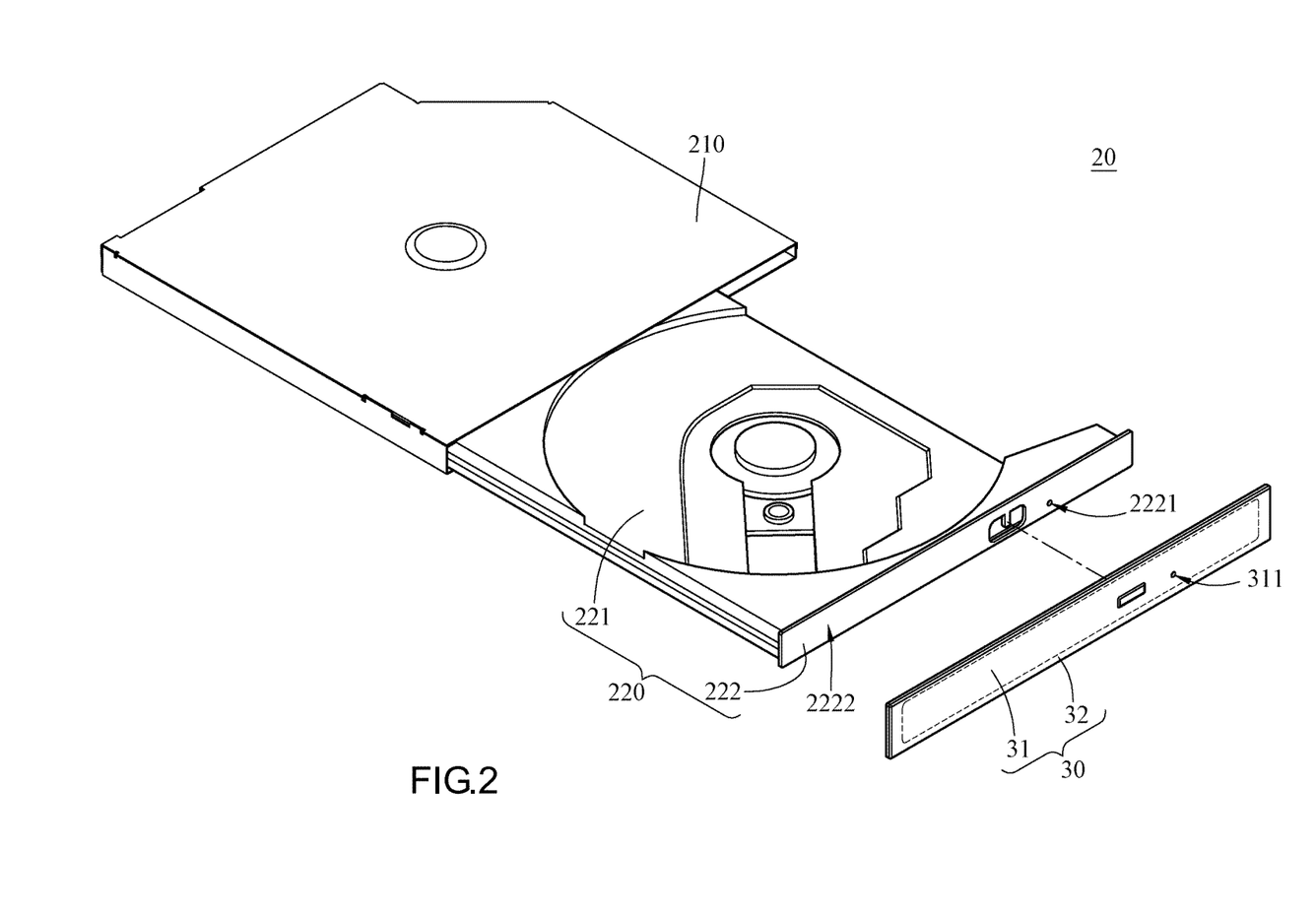
FIG. 2 is an exploded view of the optical disc drive of FIG. 1.
Figure 3:
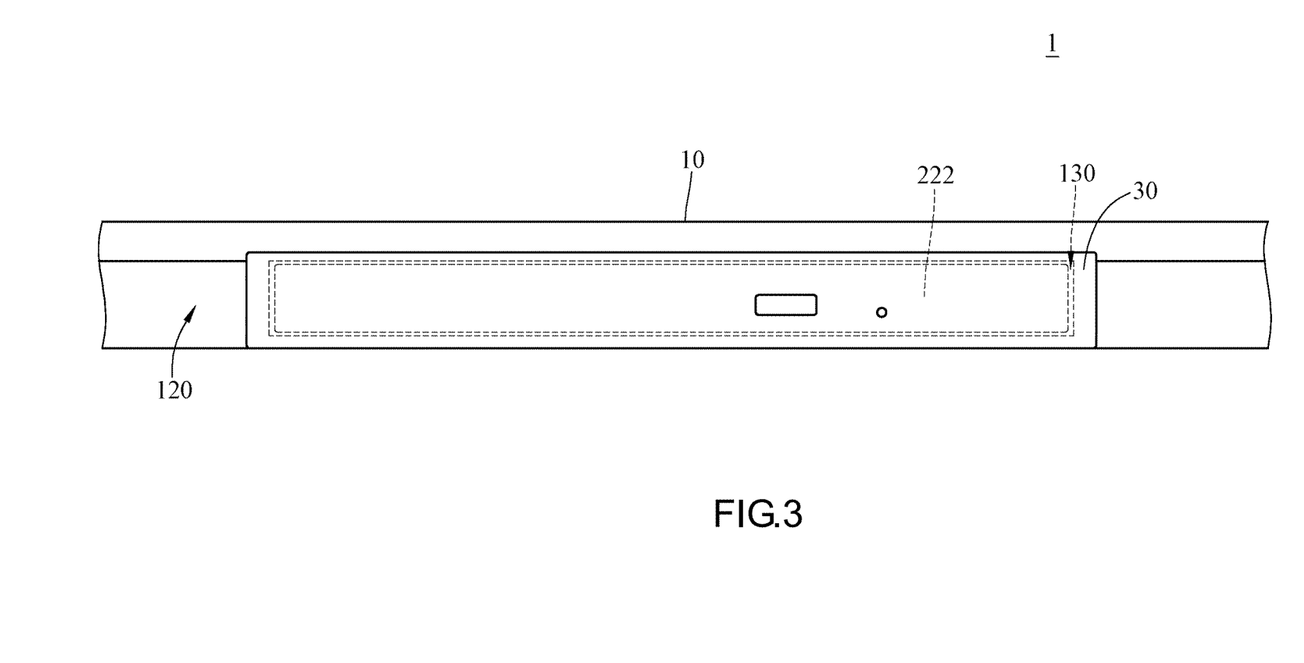
FIG. 3 is a lateral plan of the waterproof module of FIG. 1.
Figure 4:
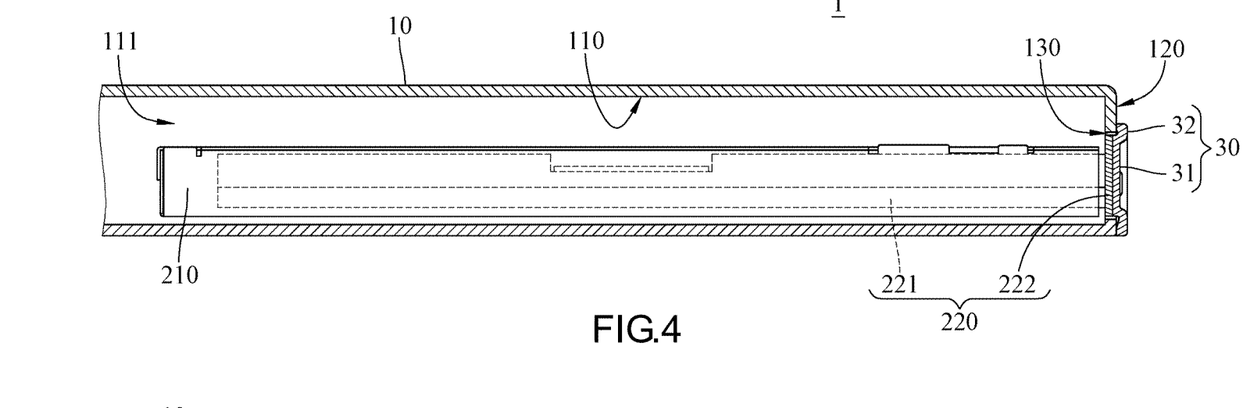
FIG. 4 is a cross-sectional view of the waterproof module taken along line 4-4' of FIG. 1.

Referring to FIG. 1 through FIG. 4, there are shown in FIG. 1 a perspective view of a waterproof module according to an embodiment of the present invention, showing that an optical disc drive of the waterproof module is at a retracted position, in FIG. 2 an exploded view of the optical disc drive of FIG. 1, in FIG. 3 a lateral plan of the waterproof module of FIG. 1, and in FIG. 4 a cross-sectional view of the waterproof module taken along line 4-4' of FIG. 1.

In this embodiment, a waterproof module 1 comprises a housing 10, an optical disc drive 20 and a seal member 30, but the present invention is not limited thereto. In another embodiment, the optical disc drive is, for example, an inserting element, as needed, and the inserting element is, for example, a mechanical docking component, such as a dustproof cover, or an electrical docking device, such as a CD-RW (CD-ReWritable), a floppy disk drive, a rechargeable battery or an external hard disk drive.

In this embodiment, the housing 10 is, for example, a housing of a military host computer, and has an inner surface 110, an outer surface 120 and an opening 130. The inner surface 110 defines a receiving space 111. The opening 130 penetrates the outer surface 120 and is in communication with the receiving space 111.

The optical disc drive 20 comprises a body 210 and a disc tray 220. The body 210 is disposed in the receiving space 111.

The disc tray 220 comprises a tray body 221 and a cover plate 222. The cover plate 222 is disposed at one end of the tray body 221. The tray body 221 is slidable relative to the body 210 such that the disc tray 220 has a retracted position and an ejected position.

The cover plate 222 has a compulsory ejection hole 2221 and a wall surface 2222 facing away the tray body 221. The compulsory ejection hole 2221 is disposed on the wall surface 2222. In this embodiment, when the disc tray 220 is disposed at the retracted position, the wall surface 2222 of the cover plate 222 is hidden below the outer surface 120 of the housing 10 and thereby disposed in the opening 130, but the present invention is not limited thereto. In another embodiment, when the disc tray is disposed at the retracted position, the wall surface of the cover plate can, for example, protrude from the outer surface of the housing as needed or be coplanar with the outer surface of the housing as needed.

As shown in FIG. 3, in this specific embodiment, owing to a clearance fit between the cover plate 222 and the opening 130, the cover plate 222 enters the opening 130 easily when the disc tray 220 is disposed at the retracted position (i.e., when the disc tray 220 retracts.) The image of the cover plate 222 orthographically projected onto the outer surface 120 of the housing 10 falls within the opening 130. There is a gap between the image of the opening 130 orthographically projected onto the outer surface 120 of the housing 10 and the image of the cover plate 222 orthographically projected onto the outer surface 120. Therefore, an undesirable scenario, in which ease of use is reduced as a result of the cover plate 222 interfering with the housing 10 as soon as the disc tray 220 of the optical disc drive 20 slides relative to the body 210 and reaches the retracted position and thus impeding the movement of the disc tray 220, is precluded.

The seal member 30 is fixed to the cover plate 222. The seal member 30 comprises a connecting portion 31 and a resilient portion 32 which surrounds the connecting portion 31. The connecting portion 31 is stacked on the cover plate 222. The resilient portion 32 surrounds the connecting portion 31. The connecting portion 31 is stacked on the wall surface 2222 of the cover plate 222, and the wall surface 2222 faces away the tray body 221. In this embodiment, the seal member 30 adheres to the cover plate 222. In another embodiment, the seal member is disposed on the cover plate by, for example, injection molding or screwing, but the present invention is not limited thereto. For instance, the cover plate 222 is formed from hard plastic by injection molding, and then a soft plastic inserting element is formed on the cover plate 222 to form the seal member 30 integrally, wherein the seal member 30 is engaged with and fixed to the cover plate 222 by the connecting portion 31. From a structural perspective, the seal member 30 is fixed to the cover plate 222 by the connecting portion 31, and the connecting portion 31 extends outward and integrally across a plane parallel to the cover plate 222 to form a resilient portion 32.

In this embodiment, the resilient portion 32 of the seal member 30 is made of a material with resilience or elasticity. Therefore, when the disc tray 220 is at the retracted position, the resilient portion 32, whose overall size is greater than that of the opening 130, rests against the outer rim of the opening 130 or the outer surface 120 of the housing 10 and thus is blocked by and pressed against the outer rim of the opening 130 or the outer surface 120 of the housing 10 because of its resilience or elasticity such that interference between the resilient portion 32 and the outer rim of the opening 130 or the outer surface 120 of the housing 10 occurs. Hence, the outer rim of the opening 130 or the outer surface 120 pushes and compresses the resilient portion 32 when the inserting element is at the retracted position. In this specific embodiment, when the disc tray 220 is at the retracted position (as shown in FIG. 4), at least a portion of the connecting portion 31 of the seal member 30 is brought into the housing 10 together with the cover plate 222, and the resilient portion 32 resting against the outer surface 120 is pulled into the housing 10 such that the resilient portion 32 bends and deforms to thereby resiliently deviate from the cover plate 222. Afterward, under its elastic restoring force, the resilient portion 32 is pressed against the outer rim of the opening 130 or the outer surface 120 of the housing 10 and thereby presses tightly against the outer rim of the opening 130 or the outer surface 120 of the housing 10, so as to seal the opening 130. According to Newton's third law of motion, sometimes referred to as the action-reaction law, the elastic restoring force exerted by the resilient portion 32 on the outer surface 120 or the outer rim of the opening 130 is accompanied by an equal and opposite force exerted by the outer rim or surface 120 on the resilient portion 32. In another specific embodiment, with the inserting element being at the retracted position, the inserting element, in whole or in part, electrically docks at an electronic device or mechanically docks inside the housing 10. The material with resilience or elasticity is, for example, Nitrile Butadiene Rubber (NBR), Hydrogenated Nitrile Butadiene Rubber (HNBR), Silicone (SIL) Rubber, Fluoro Rubber (Viton), Fluorinated Silicone Rubber (FLS), Ethylene Propylene Diene Monomer (EPDM) rubber, Chloroprene (CR) rubber, Isobutylene-Isoprene Rubber (IIR), Polyacrylate Rubber (ACM), Natural Rubber (NR), Polyurethane (PU) Rubber or Metal Rubber, as each of them is waterproof, but the present invention is not limited thereto. In another embodiment, the resilient portion is, for example, made of silica gel or soft plastic as needed. Furthermore, the connecting portion is, for example, made of hard plastic, materials with no resilience or the aforesaid materials with resilience as needed.

As shown in FIG. 3, the resilient portion 32 of the seal member 30 extends outward along the periphery of the cover plate 222, and the image of the seal member 30 orthographically projected onto the outer surface 120 of the housing 10 has a larger area than the opening 130 of the housing 10 to ensure that the seal member 30 covers the opening 130 of the housing 10 fully when the resilient portion 32 of the seal member 30 rests against the outer surface 120 of the housing 10.

In this embodiment, the connecting portion 31 of the seal member 30 has an insertion hole 311, and the insertion hole 311 is in alignment with the compulsory ejection hole 2221 of the cover plate 222 to allow a user to eject the disc tray 220 by hand. The seal member 30 will be effective in sealing the opening 130, provided that the cohesive force of water is greater than the adhesive force of capillarity. It is because in the aforesaid situation water is unlikely to intrude into the housing 10 by passing through the insertion hole 311 and the compulsory ejection hole 2221 consecutively. In this specific embodiment, the waterproof module 1 is designed to pass a waterproof test, i.e., IPX2, and the dripping direction is not aligned with the opening direction; hence, accumulation of water in the vicinity of the opening or development of invasive water pressure is unlikely, let alone intrusion of water into the optical disc drive 20 through the insertion hole 311 and the compulsory ejection hole 2221. In this embodiment, the connecting portion has an insertion hole, and the cover plate has a compulsory ejection hole, but the present invention is not limited thereto. In another embodiment, the connecting portion and the cover plate dispense with any insertion hole and compulsory ejection hole as needed.

Figure 5:
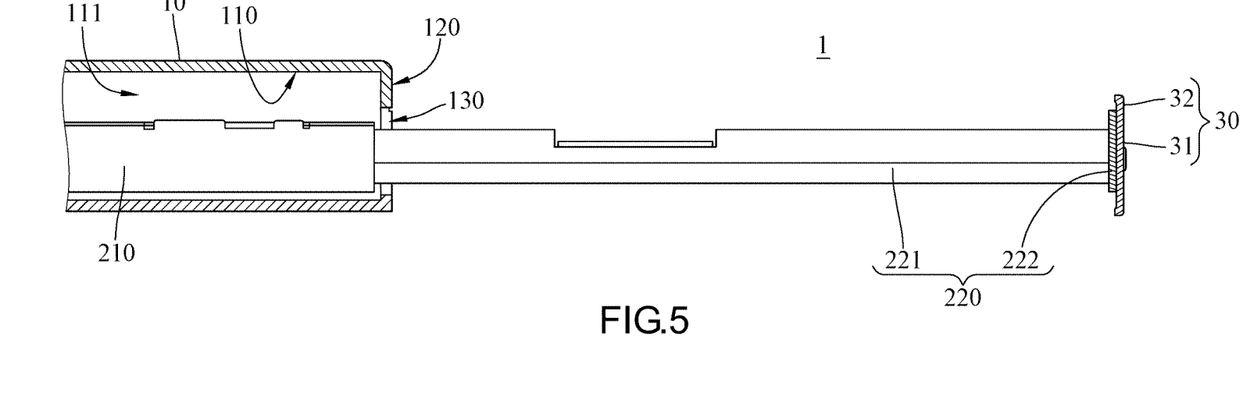
FIG. 5 is a schematic view which shows that a disc tray of the optical disc drive of FIG. 4 is at an ejected position.

FIG. 5 is a schematic view which shows that a disc tray of the optical disc drive of FIG. 4 is at an ejected position. Referring to FIG. 4 and FIG. 5, the user may change an optical disc (not shown) on the tray body 221 when the disc tray 220 of the optical disc drive 20 is at the ejected position; meanwhile, the cover plate 222 and the seal member 30 disposed on the cover plate 222 are positioned distal to the housing 10. Afterward, as shown in FIG. 4, the resilient portion 32 of the seal member 30 presses against the outer surface 120 of the housing 10 and seals the opening 130 when the disc tray 220 moves from the ejected position to the retracted position, thereby effectuating sealing. In this embodiment, the wall surface 2222 of the cover plate 222 is hidden below the outer surface 120 of the housing 10 when the disc tray 220 is at the retracted position. Therefore, at least a portion of the connecting portion 31 of the seal member 30 is brought into the housing 10 together with the cover plate 222. As a result, the resilient portion 32 resting against the housing 10 bends and deforms so as to resiliently deviate from the cover plate 222. Hence, under its elastic restoring force, the resilient portion 32 is pressed against the rim of the opening 130 or the outer surface 120 of the housing 10 and thereby presses tightly against the rim of the opening 130 or the outer surface 120 of the housing 10. As a result of this, the opening 130 is sealed with the resilient portion 32. In addition, the difference between internal pressure and external pressure enhances the sealing of the opening 130 by the seal member 30 and thereby enables the waterproof module 1 in this embodiment to effectuate water intrusion prevention efficiently.

Figure 6:
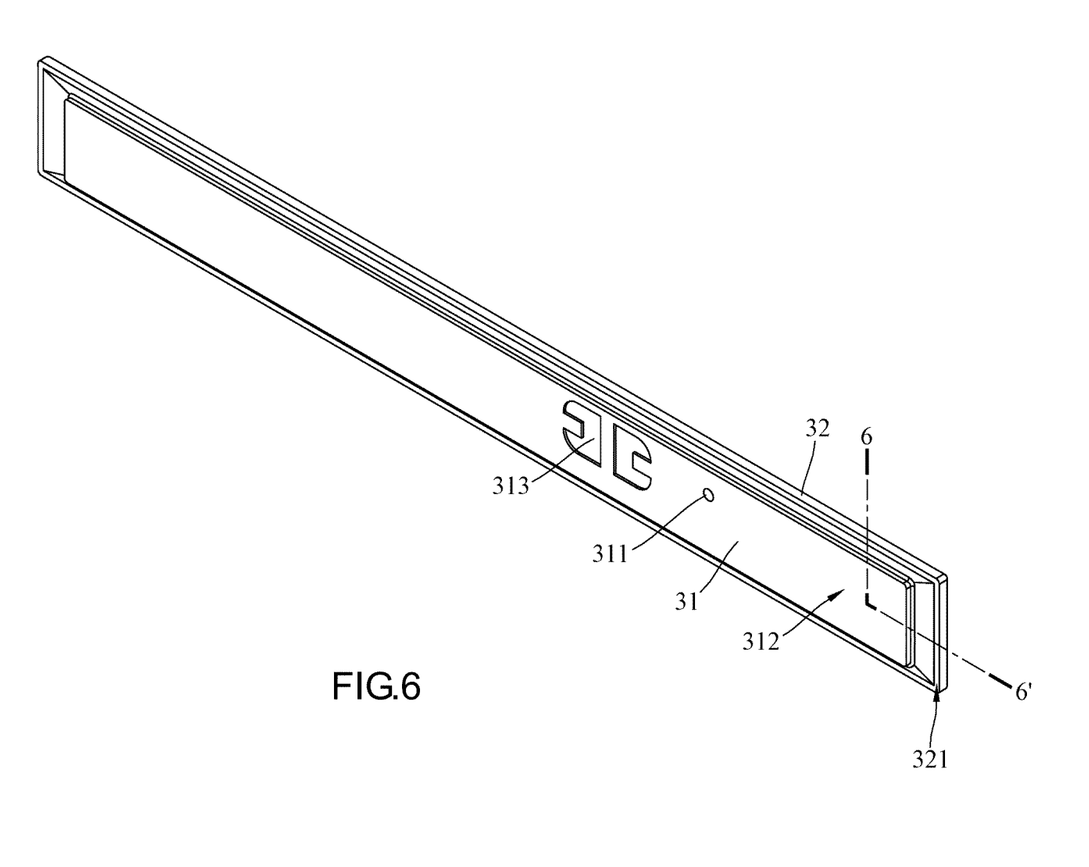
FIG. 6 is a perspective view of a seal member according to another embodiment of the present invention.
Figure 7:
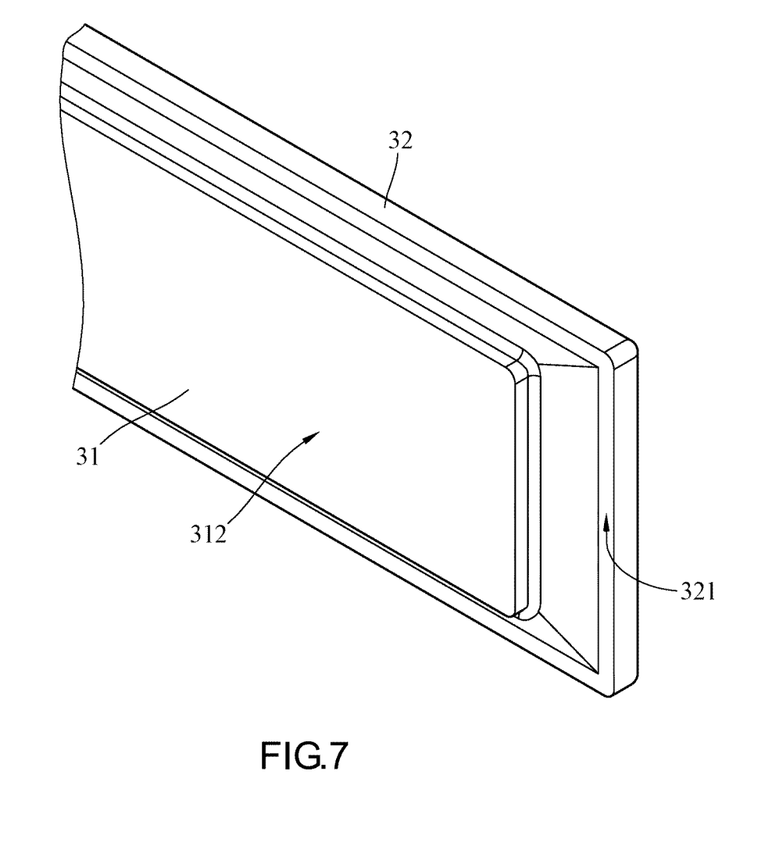
FIG. 7 is a partial enlarged view of the seal member of FIG. 6.
Figure 8:
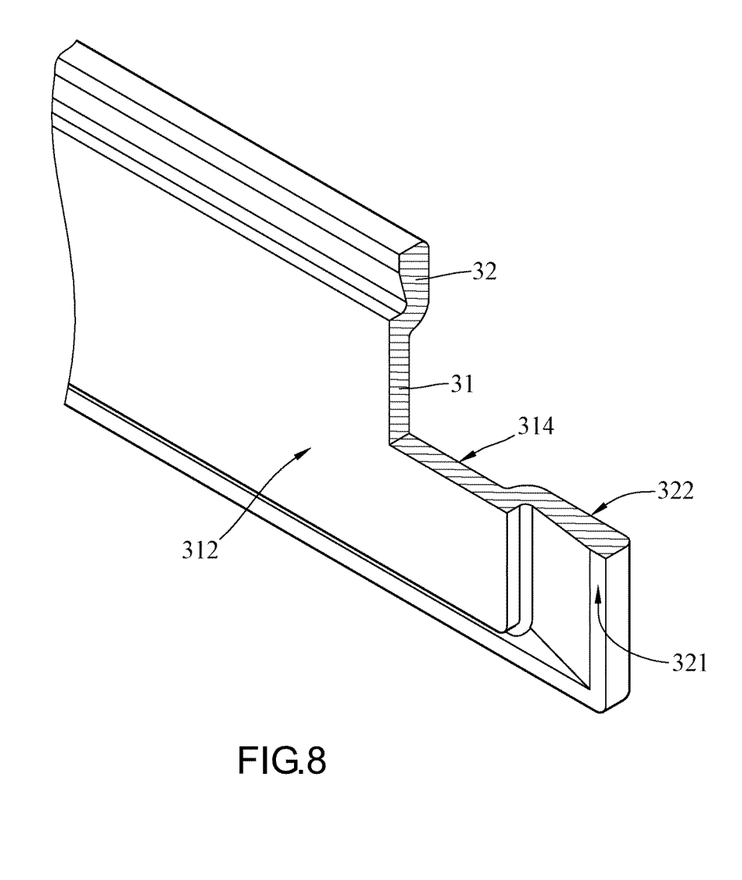
FIG. 8 is a cutaway view of the seal member taken along line 6-6' of FIG. 6.
Figure 9:
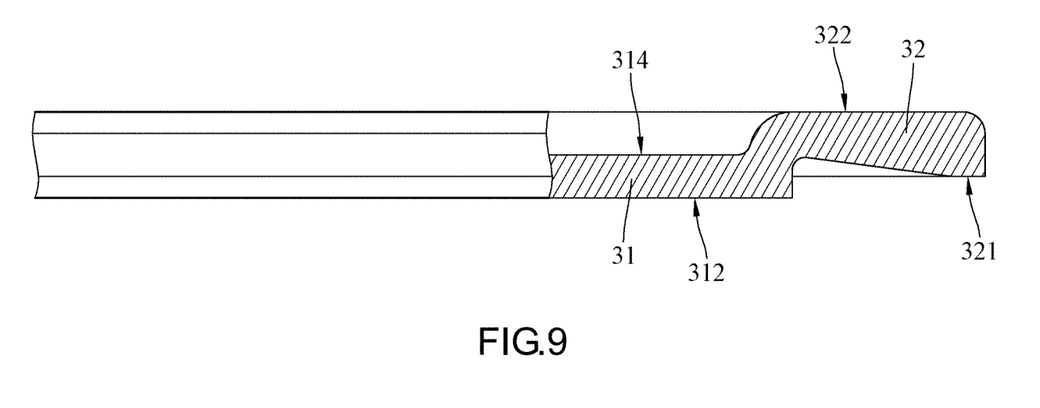
FIG. 9 is a front cutaway view of the seal member taken along line 6-6' of FIG. 6.
Figure 10:
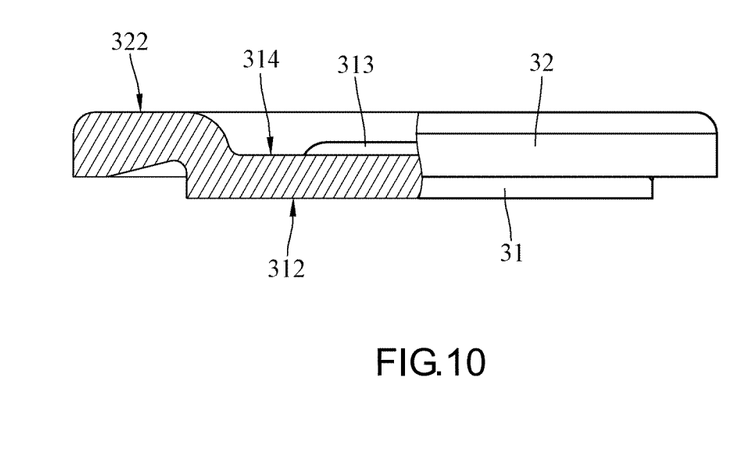
FIG. 10 is a top cutaway view of the seal member taken along line 6-6' of FIG. 6.
Figure 11:
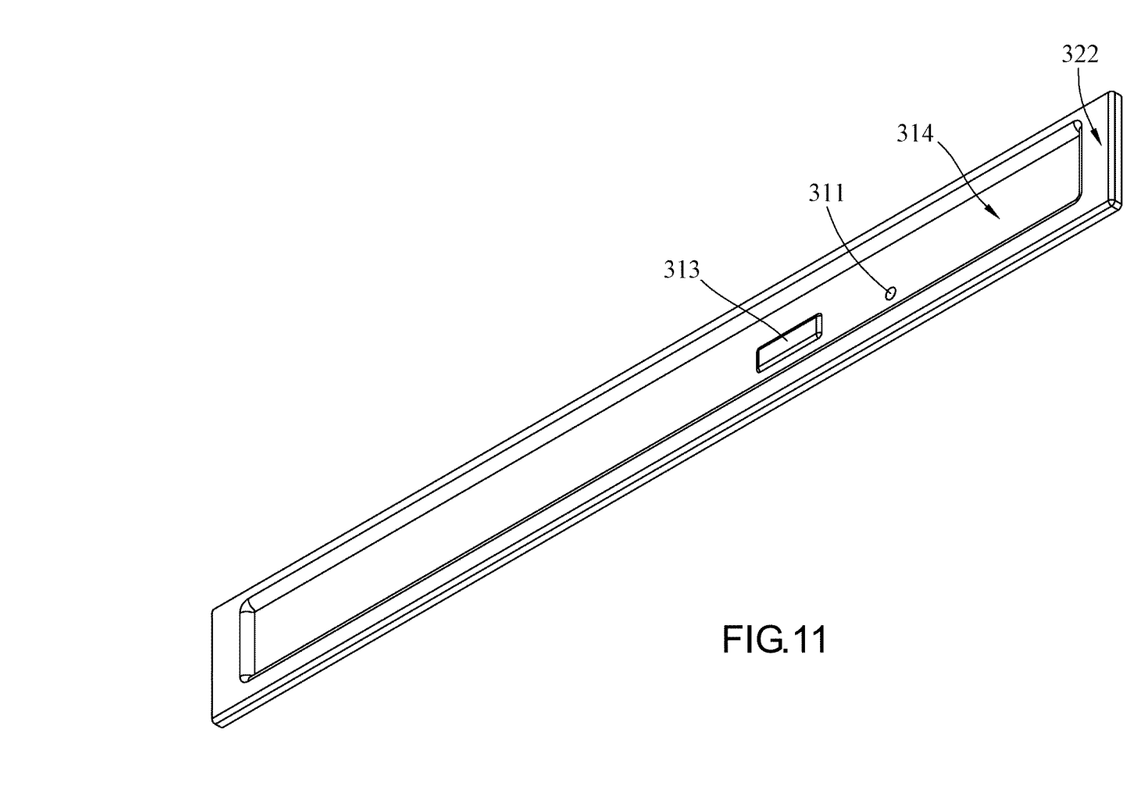
FIG. 11 is a perspective view of the seal member of FIG. 6 taken from another angle.
Figure 12:
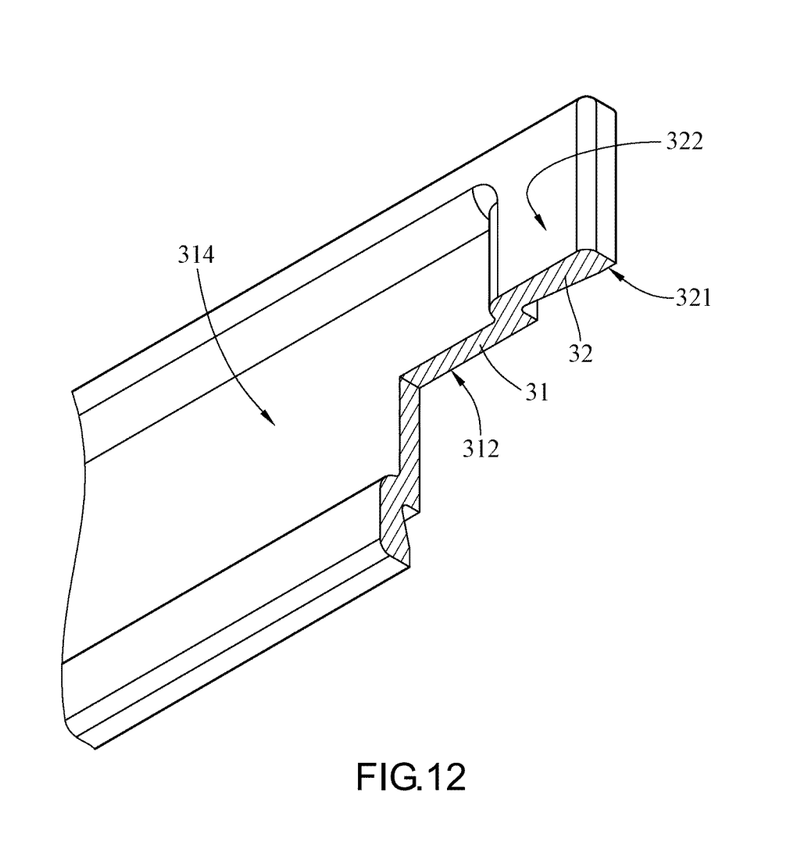
FIG. 12 is a cutaway view of the seal member taken along line 6-6' of FIG. 6 from another angle.

Referring to FIGS. 6-12, there are shown in FIG. 6 a perspective view of the seal member 30 according to another embodiment of the present invention, in FIG. 7 a partial enlarged view of the seal member 30 of FIG. 6, in FIG. 8 a cutaway view of the seal member 30 taken along line 6-6' of FIG. 6, in FIG. 9 a front cutaway view of the seal member 30 taken along line 6-6' of FIG. 6, in FIG. 10 a top cutaway view of the seal member 30 taken along line 6-6' of FIG. 6, in FIG. 11 a perspective view of the seal member 30 of FIG. 6 taken from another angle, and in FIG. 12 a cutaway view of the seal member 30 taken along line 6-6' of FIG. 6 from another angle.

The seal member 30 is fixed to the inserting element and adapted to seal the outer rim of the opening 130. The inserting element enters or exits the housing 10 through the opening 130. The seal member 30 comprises the connecting portion 31 and the resilient portion 32. The seal member 30 is fixed to the inserting element by the connecting portion 31. In this specific embodiment, an inner side 312 of the connecting portion 31 adheres to the cover plate 222 of the inserting element. In another specific embodiment, the connecting portion 31 is molded onto or around the inserting element or the cover plate 222 thereof by insert molding. In addition to the insertion hole 311, the connecting portion 31 has a button portion 313 in this specific embodiment. Two depressions are formed on the inner side 312 of the connecting portion 31. An elevation is formed on an outer side 314 of the connecting portion 31. The resilient portion 32 surrounds the connecting portion 31. The outermost edge of the resilient portion 32 forms a seal surface 321 which faces the outer rim of the opening 130 such that the seal surface 321 is suspended around peripheral sides of the connecting portion 31 and substantially parallel to the outer rim of the opening 130, wherein the outer rim of the opening 130 is substantially coplanar. The other side at the outermost edge of the resilient portion 32 forms a protruding surface 322. The protruding surface 322 protrudes from the outer side 314. The elevation formed on the outer side 314 by the button portion 313 is not higher than the protruding surface 322 to serve a foolproof purpose. The outer rim of the opening 130 or the outer surface 120 of the housing 10 blocks the resilient portion 32 at the seal surface 321 thereof when the inserting element docks or is at the retracted position. The thickness of the resilient portion 32 decreases gradually toward the connecting portion 31 to more easily allow deformation at the junction of the resilient portion 32 and the connecting portion 31. The deformation is elastic deformation in principle. In this specific embodiment, the resilient portion 32 is of the greatest thickness at the seal surface 321, and beveled concavity is formed on the same side of the seal surface 321, thereby allowing the resilient portion 32 to taper off or thin gradually from the seal surface 321 until the resilient portion 32 connects with the connecting portion 31, wherein a rounded angle at the connection is formed. As soon as the outer rim of the opening 130 or the outer surface 120 of the housing 10 blocks the resilient portion 32 at the seal surface 321 thereof, the connecting portion 31 hauls the resilient portion 32 toward the inner side of the opening 130 to thereby cause deformation at where the resilient portion 32 tapers off or the junction of the resilient portion 32 and the connecting portion 31. The seal surface 321 of the resilient portion 32 rests against the outer rim of the opening 130 or the outer surface 120 of the housing 10 to prevent intrusion of water. The connecting portion 31 is offset toward the normal vector of the seal surface 321 when the seal member 30 is not subjected to any force. When the outer rim of the opening 130 or the outer surface 120 of the housing 10 blocks the resilient portion 32 at the seal surface 321, where action-reaction occurs, the connecting portion 31 further deviates from the seal surface 321 toward the normal vector thereof or the inner side of the opening 130 by where the resilient portion 32 tapers off, which is prone to elastic deformation.

Regarding a waterproof module and a seal member thereof according to the aforesaid embodiment, the seal member with resilience or elasticity is disposed on a cover plate of an optical disc drive or an inserting element. The seal member extends outward along the periphery of the cover plate. The image of the seal member orthographically projected onto the outer surface of the housing has a larger area than an opening of the housing to ensure that a seal surface of a resilient portion of the seal member and the outer rim of the opening or the outer surface of the housing interfere with each other when the disc tray is at the retracted position or the inserting element docks or is inserted in place such that the seal member presses against the outer rim of the opening or the outer surface of the housing and covers the vicinity of the opening of the housing tightly and fully, so as to seal the opening and thus achieve the minimum waterproofing standard of water intrusion prevention.

Since the resilient portion of the seal member is made of a material with resilience or elasticity, at least a portion of the connecting portion of the seal member is brought into the housing together with the cover plate, and the resilient portion resting against the outer surface is pulled into the housing such that the resilient portion bends and deforms to thereby resiliently deviate from the cover plate, as soon as the disc tray reaches the retracted position, and in consequence, under its elastic restoring force, the resilient portion is pressed against the outer rim of the opening or the outer surface of the housing and thereby presses tightly against the outer rim of the opening or the outer surface of the housing, so as to further augment the sealing of the opening of the housing by the seal member. Therefore, according to the present invention, the resilient portion of the seal member forms a flange surrounding the connecting portion of the seal member, and the outer rim of the opening or the outer surface of the housing abuts against the resilient portion such that the opening is tightly sealed with the resilient portion or the resilient portion tightly abuts onto the outer surface outside the opening to prevent intrusion of water through the opening, thereby preventing accumulation of water in the housing.

Although the present invention is disclosed above by preferred embodiments, the preferred embodiments are not restrictive of the present invention. Persons skilled in the art may make slight changes and modifications to the preferred embodiments without departing from the spirit and scope of the present invention. Therefore, the scope of the protection of rights of the present invention shall be defined by the appended claims.

What is claimed is:

1. A module, comprising:
a housing having an opening, wherein the opening penetrates through an outer surface of the housing;
an inserting element adapted to enter and exit the housing through the opening; and
a seal member comprising a connecting portion and a resilient portion, wherein the resilient portion surrounds and extends away from a periphery of the connecting portion, the connecting portion is fixed to the inserting element, the connecting portion is proportioned to fit in the opening, and the resilient portion and the connecting portion are proportioned and arranged such that when the inserting element is moved from an ejected position to a retracted position, the connecting portion at least partially enters into the opening, the resilient portion is pressed against the outer surface of the housing at a periphery of the opening, the resilient portion is deformed at a junction of the resilient portion and the connecting portion so as to bend away from the inserting element, and a waterproof seal is created between the resilient portion and the outer surface of the housing.

2. The module of claim 1, wherein the housing further comprises an inner surface, the inner surface defining a receiving space, wherein the opening penetrates the outer surface and is in communication with the receiving space;
wherein the inserting element is an optical disc drive, comprising:
a body disposed in the receiving space; and
a disc tray comprising a tray body and a cover plate, with the cover plate disposed at an end of the tray body, and the tray body being movable relative to the body to allow the disc tray to have a retracted position and an ejected position;
wherein the connecting portion of the seal member is stacked on the cover plate; and
wherein the resilient portion presses against the outer surface and seals the opening when the disc tray moves from the ejected position to the retracted position.

3. The module of claim 2, wherein the seal member protrudes from a rim of the cover plate, and an image of the seal member orthographically projected onto the outer surface has a greater area than the opening.

4. The module of claim 2, wherein an image of the cover plate orthographically projected onto the outer surface falls inside a rim of the opening.

5. The module of claim 2, wherein the cover plate has a compulsory ejection hole, and the seal member has an insertion hole in alignment with the compulsory ejection hole.

6. The module of claim 2, wherein the seal member is disposed on the cover plate by one of injection molding and adhesion.

7. The module of claim 2, wherein the cover plate has a wall surface facing away from the tray body, and the wall surface of the cover plate is hidden below the outer surface when the disc tray is at the retracted position.

8. The module of claim 2, wherein the resilient portion of the seal member is made of one of rubber, silica gel and plastic.

9. The module of claim 8, wherein the connecting portion of the seal member is made of one of rubber, silica gel and plastic.

10. The module of claim 1, wherein a thickness of the resilient portion decreases gradually toward the connecting portion to allow deformation at a junction of the resilient portion and the connecting portion.

11. The module of claim 1, wherein the connecting portion pulls the resilient portion to cause deformation at a junction of the connecting portion and the resilient portion when the inserting element is at the retracted position and the resilient portion is pressed against the outer surface of the housing.

12. The module of claim 1, wherein a seal surface of the resilient portion rests against the outer surface of the housing at the periphery of the opening when the inserting element is at the retracted position, thereby preventing intrusion of water.

13. The module of claim 12, wherein the connecting portion is offset from the seal surface when the inserting element is at the ejected position, and the connecting portion further deviates from the seal surface when the inserting element is at the retracted position and the resilient portion is pressed against the outer surface of the housing.

14. The module of claim 1, wherein the resilient portion directly contacts the periphery of the connecting portion.

15. A seal member, adapted to be fixed to an inserting element and adapted to seal an outer rim of an opening formed in an outer surface of a housing when the inserting element is in a retracted position, the seal member comprising:

a connecting portion, whereby the seal member is adapted to be fixed to the inserting element; and a resilient portion surrounding and extending away from a periphery of the connecting portion, wherein a thickness of the resilient portion decreases gradually toward the connecting portion to allow deformation at a junction of the resilient portion and the connecting portion.

16. The seal member of claim 15, wherein the connecting portion pulls the resilient portion to cause deformation at a junction of the resilient portion and the connecting portion when the inserting element is at the retracted position and the resilient portion is pressed against the outer surface of the housing.

17. The seal member of claim 15, wherein the resilient portion has a seal surface adapted to rest against the outer surface of the housing at the periphery of the opening when the inserting element is at the retracted position, thereby preventing intrusion of water.

18. The seal member of claim 15, wherein the resilient portion has a seal surface, the connecting portion is offset from the seal surface when the inserting element is at an ejected position, wherein the resilient portion and connecting portion are proportioned and arranged such that the connecting portion further deviates from the seal surface when the inserting element is at the retracted position and the resilient portion is pressed against the outer surface of the housing.

19. The seal member of claim 15, wherein the resilient portion directly contacts the periphery of the connecting portion.

* * * * *

UNITED STATES PATENT AND TRADEMARK OFFICE
CERTIFICATE OF CORRECTION

PATENT NO. : 10,482,927 B2  
APPLICATION NO. : 16/031169  
DATED : November 19, 2019  
INVENTOR(S) : Tzu-Chiu Huang and Juei-Chi Chang Page 1 of 1

It is certified that error appears in the above-identified patent and that said Letters Patent is hereby corrected as shown below:

On the Title Page

Item (73) should read:
GETAC TECHNOLOGY CORPORATION, HSINCHU COUNTY (TW)

Signed and Sealed this
Fourteenth Day of April, 2020

Andrei Iancu
*Director of the United States Patent and Trademark Office*